(12) United States Patent
Shih

(10) Patent No.: US 7,434,947 B2
(45) Date of Patent: Oct. 14, 2008

(54) ADAPTIVE PHASE MASK FOR PRODUCING A PHASE SHIFT IN INCIDENT LIGHT

(75) Inventor: Chun-Ching Shih, Palos Verdes Estates, CA (US)

(73) Assignee: Northrop Grumman Space & Mission Systems Corporation, Los Angeles, CA (US)

( * ) Notice: Subject to any disclaimer, the term of this patent is extended or adjusted under 35 U.S.C. 154(b) by 119 days.

(21) Appl. No.: 11/637,350

(22) Filed: Dec. 12, 2006

(65) Prior Publication Data

US 2008/0137174 A1      Jun. 12, 2008

(51) Int. Cl.
*G02B 5/10* (2006.01)
*G02B 5/08* (2006.01)

(52) U.S. Cl. .................. 359/602; 359/849; 359/853

(58) Field of Classification Search ............. 359/364, 359/602, 605, 608, 849, 851, 853
See application file for complete search history.

(56) References Cited

U.S. PATENT DOCUMENTS

| 3,523,298 | A | * | 8/1970 | Hagen ..................... 343/775 |
|---|---|---|---|---|
| 4,923,293 | A | | 5/1990 | Nelles et al. |
| 5,249,080 | A | | 9/1993 | Watson et al. |
| 5,291,333 | A | | 3/1994 | Mills et al. |
| 5,450,352 | A | | 9/1995 | Ftaclas et al. |
| 5,854,713 | A | * | 12/1998 | Kuroda et al. ............... 359/850 |
| 5,898,529 | A | | 4/1999 | Meyer et al. |
| 2004/0156087 | A1 | | 8/2004 | Oppenheimer et al. |
| 2007/0286461 | A1 | * | 12/2007 | Deforest ..................... 382/103 |

OTHER PUBLICATIONS

Mawet, et al.: *"Annular Groove Phase Mask Coronagraph"*; The Astrophysical Journal, Nov. 10, 2005/vol. 633, pp. 1191-1200.
Foo, et al.: *"Optical Vortex Coronagraph"*; Optics Letters, vol. 30, No. 24, Dec. 15, 2005, pp. 3308-3310.

\* cited by examiner

*Primary Examiner*—David N Spector
(74) *Attorney, Agent, or Firm*—Tarolli, Sundheim, Covell & Tummino LLP

(57) ABSTRACT

Systems and methods for shifting the phase of incident light to induce a continuous phase variation in an azimuthal direction. A phase mask apparatus includes a conical mirror assembly and a flexible annular reflector that substantially surrounds at least a portion of the conical mirror assembly. The flexible annular reflector is configured to receive reflected light from the conical mirror assembly. A plurality of driver assemblies are operative to deform the flexible annular reflector as to produce the desired phase response in light reflected from the annular reflector.

19 Claims, 3 Drawing Sheets

ADAPTIVE PHASE MASK FOR PRODUCING A PHASE SHIFT IN INCIDENT LIGHT

TECHNICAL FIELD

The present invention relates generally to optical technology, and more particularly to an adaptive phase mask that induces a phase variation in an azimuthal direction in incident light.

BACKGROUND OF THE INVENTION

Detecting planets outside of the solar system is frequently complicated by the relative proximity of extrasolar planets to the stars they orbit. Since planets can be located only by the reflected light of their star, the star will be significantly brighter than the planet of interest, in some cases on the order of ten million times brighter. In light of the relative proximity of a planet to its star, it is necessary to attenuate the light of the star to obtain a useful image of the planet. In general, this has been accomplished through the use of coronagraphs. The design of coronagraphs can vary, including simple coronagraphs that utilize an occulting disk to block the star's light and nulling coronagraphs that use a phase mask to shift the phase of light, as opposed to directly blocking it. An occulting disk is usually used to block the sun and retrieve corona images. However, it is more suitable to use a phase mask for star systems because the entrance aperture dominates the diffraction effect of images.

In many applications, a given phase mask is designed to interact with light of a certain wavelength. For example, the thickness of a given phase mask can be selected to provide a specific amount of phase to incident light, such that the light of the desired wavelength outputted from the phase mask will have a desired phase pattern. As will be appreciated, light of a different wavelength will be shifted in phase by a different fraction of the wavelength as it passes through the phase mask, skewing the desired phase pattern. Unfortunately, this ensures that a different phase mask is necessary for each wavelength that is of interest, increasing the expense of a coronagraph apparatus, and inconveniencing a user who must replace the phase mask each time an object having different spectral characteristic is viewed.

SUMMARY OF THE INVENTION

In accordance with an aspect of the present invention, a phase mask apparatus is provided for producing a desired phase response in incident light. The apparatus includes a conical mirror assembly and a flexible annular reflector that substantially surrounds at least a portion of the conical mirror assembly. The flexible annular reflector is configured to receive reflected light from the conical mirror assembly. A plurality of driver assemblies are operative to deform the flexible annular reflector as to produce the desired phase response in light reflected from the annular reflector.

In accordance with another aspect of the present invention, a coronagraph apparatus is provided for separating a desired off-axis image from an undesired central image having a greater intensity. A first imaging lens receives light representing the desired image and the undesired central image. A reimaging portion mitigates the undesired central image. The reimaging portion includes a phase mask assembly, that includes a conical mirror assembly and a flexible annular reflector that substantially surrounds at least a portion of the conical mirror assembly. The flexible annular reflector is configured to receive reflected light from the conical mirror assembly. A plurality of driver assemblies are operative to deform the flexible annular reflector as to produce the desired phase response in light reflected from the annular reflector.

In accordance with yet another aspect of the present invention, a method is provided for adaptively introducing a continuous phase variation to incident light along an azimuthal direction via a phase mask. A wavelength of interest is selected, and a desired phase response is determined for the phase mask. A plurality of drivers associated with the phase mask are positioned to deform an annular reflector in the path of incident light, such that the path length taken by the incident light is adjusted as to implement the desired phase response for light of the wavelength of interest

DETAILED DESCRIPTION OF INVENTION

Figure 1:
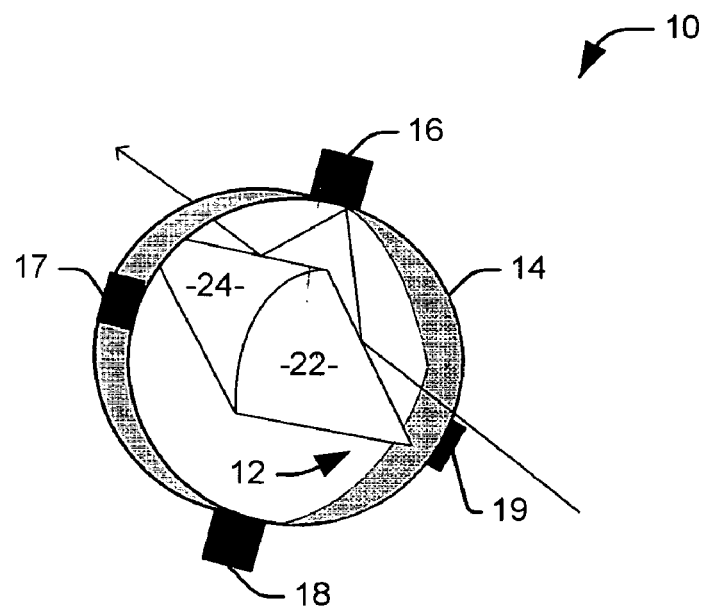
FIG. 1 illustrates an adaptive phase mask assembly that imposes a continuous phase variation in an azimuthal direction upon incident light in accordance with an aspect of the present invention.

FIG. 1 illustrates an adaptive phase mask assembly 10 that imposes a continuous phase variation in an azimuthal direction upon incident light in accordance with an aspect of the present invention. The phase mask assembly 10 comprises a conical mirror assembly 12 and an annular reflector 14 that surrounds the conical mirror assembly. The annular reflector 14 has an associated plurality of drivers 16-19 that are operative to engage the annular reflector, for example, mechanically, magnetically, or electrostatically, as to deform the annular reflector from an original circular shape. In one implementation, the plurality of drivers 16-19 can comprise electrical step motors that mechanically engage the annular reflector 14 to provide a desired deformation. The phase mask 10 assembly can be configured to operate in a reasonably broad spectrum, allowing for viewing of multiple objects having different spectral proprieties without the necessity of replacing the phase mask between viewings. In one implementation, the broad spectrum can comprise at least the visible spectrum of light.

Incident light is reflected at a first conical mirror 22 in the conical mirror assembly 12, such that light traveling on an axis coincident with the axis of the conical assembly is reflected to the annular reflector 14. The light then reflects from the annular reflector 14 to a second conical mirror 24, which reflects the light back onto a path coincident with the axis. By deforming the annular reflector 14 at a given location, it is possible to alter the path length of light reflected from that and neighboring locations. The shape of the annular reflector 14 at key positions can be altered systematically to induce a desired phase shift in the incident light along various azimuthal angles. In one implementation, the plurality of drivers 16-19 can comprise four drivers spaced evenly around the annular reflector, such that each driver is separated by ninety degrees. It will be appreciated, however, that the phase mask assembly 10 can include more or less drivers in different configurations, and that the complexity of the phase variation that can be induced by the phase mask 10 depends on the number and positioning of the plurality of drivers.

In accordance with an aspect of the present invention, each of the plurality of drivers 16-19 can shift its associated portion of the annular reflector 14 forward or backward along a range on the order of one wavelength of a longest wavelength of light encompassed by the associated spectrum of the phase mask 10. Accordingly, a phase shift of up to one wavelength can be induced in any particular wavelength of light within the spectrum by changing the path length, allowing for a continuous, azimuthal variation in phase to be induced in any wavelength of incident light falling within the spectrum. The adaptive phase mask assembly 10 thus provides a flexible, efficient means for providing a desired azimuthal response in optical applications.

Figure 2:
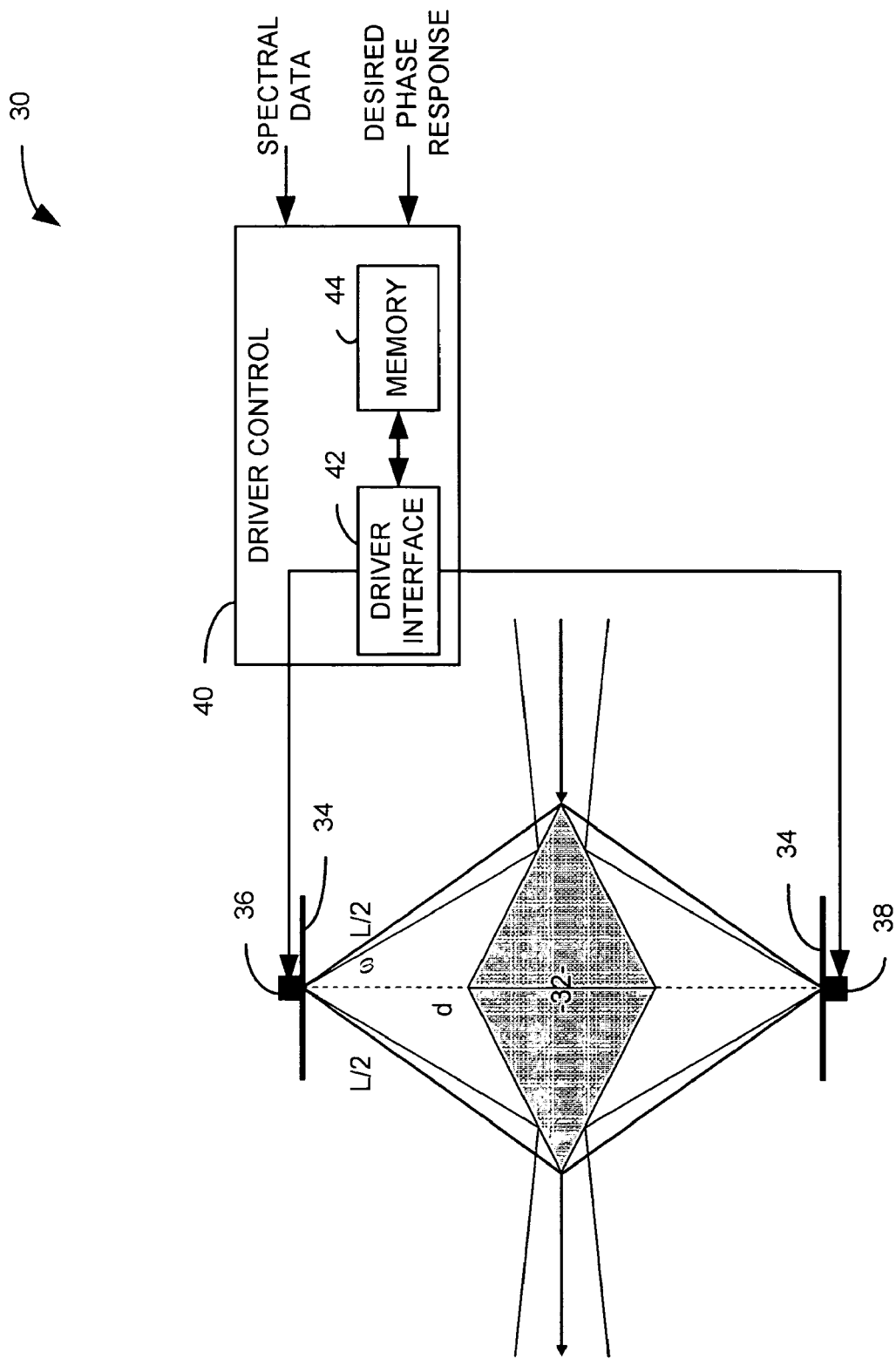
FIG. 2 illustrates a functional block diagram, incorporating a cross-sectional view, of an exemplary phase mask assembly in accordance with an aspect of the present invention

FIG. 2 illustrates a functional block diagram, incorporating a cross-sectional view, of an exemplary phase mask assembly 30 in accordance with an aspect of the present invention. The phase mask assembly 30 comprises a conical mirror assembly 32 that redirects incident light onto an annular reflector 34 that substantially surrounds at least a portion of the conical mirror assembly. It will be appreciated that the incident light can be focused or otherwise directed onto the conical mirror assembly 32 such that the reflected light is substantially evenly distributed around the annular reflector 34. The light reflects from the annular reflector 34 back to the other side of the conical mirror assembly 32, where it is reflected back to approximately its original path. In accordance with an aspect of the present invention, a plurality of drivers 36 and 38 can be positioned around the annular ring to adjust the shape of the ring.

Specifically, the illustrated drivers 36 and 38 can move the ring radially inward or outward at the position at which they are affixed to the ring. It will be appreciated that the portions of the ring adjacent to the drivers 36 and 38 will also be affected by this movement, such that there is a continuous variation in distance around the annular ring when the drivers are properly configured. By limiting the action of the drivers to a small amount (on the order of a wavelength) of radial movement, the path of the reflected light is not substantially altered by the movement of the drivers 36 and 38, but the distance traveled by the light in passing from one side of the conical mirror assembly 32 to the other, referred to herein as the path length, is altered slightly. This slight change in path length introduces a phase shift into light reflected at and around the position associated with the driver.

In accordance with an aspect of the present invention, the drivers 36 and 38 can be controlled by a driver control 40. The driver control 40 configures the radial position of the plurality of drivers 36 and 38 as to change an associated path length, L, of the light reflected from the annular reflector. In the illustrated example, a radial distance, d, between the conical mirror 32 and the annular reflector 34 in the plane of the annular reflector is considered to be large compared to the range of motion of the drivers 36 and 38. Accordingly, an angle of reflection, θ, of light received at the annular reflector, will not change significantly with the movement of the drivers 36 and 38. Since the configuration of the conical mirror and the annular reflector is known, the angle of reflection, θ, can be considered a known constant.

In accordance with an aspect of the present invention, the driver control 40 can receive information (e.g., from a user via a user interface (not shown)) on the spectral composition of an image of interest as well as a desired azimuthal phase response. From these values, a desired path length, L, can be determined for each point around the annular reflector. It will be appreciated, however, that the complexity of the phase response will be limited by the number of drivers 36 and 38 utilized. From the desired path length and the angle of reflection, a desired radial distance, d, can be determined at each point, and the drivers 36 and 38 can be instructed via a driver interface 42 to deform the annular reflection such that the desired radial distance is achieved. In the illustrated example, these calculations can be performed in advance and stored in an associated memory 44, such that the desired driver configurations for a given phase response and band of wavelengths can be quickly accessed and implemented by the driver control 40.

Figure 3:
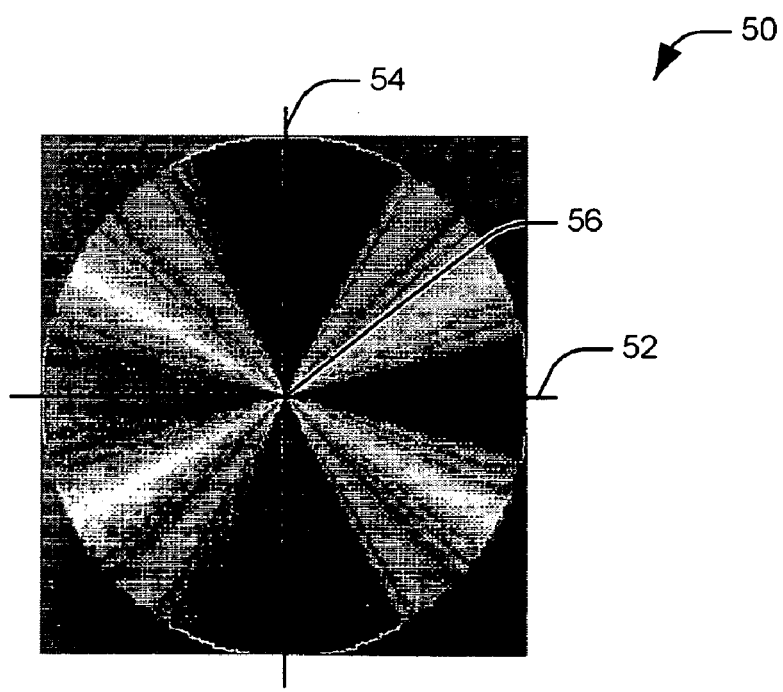
FIG. 3 illustrates an exemplary phase profile for a phase mask in accordance with an aspect of the present invention.

FIG. 3 illustrates an exemplary phase profile 50 for a phase mask in accordance with an aspect of the present invention. The phase profile 50 is illustrated against an arbitrary coordinate axis comprising a horizontal axis 52 and a vertical axis 54 passing through an origin 56 representing the center of the phase mask, It will be appreciated that the coordinate axis is arbitrary, and that the particular orientation of the axes 52 and 54 relative to the phase profile 50 is selected to coincide with a region of maximum width merely to simplify explanation of the phase profile. One skilled in the art will understand that the description provided below can be altered to accommodate any orientation of the axes 52 and 54.

In the illustrated example, the phase profile 50 can be generated using a phase mask system with four drivers, with opposing drivers configured such that the path length experienced by incident light is increased by approximately one-half wavelength at one pair of opposing drivers and decreased by approximately one-half wavelength at a second pair of opposing drivers. The phase profile 50 produced by this arrangement is approximately sinusoidal, which is desirable to avoid phase singularities in the azimuthal direction away from the origin 56 of the phase profile. Specifically, the illustrated phase profile 50 can be described as:

$$\phi(\theta) = a\cos(2n\theta) \qquad \text{Eq. 1}$$

where $\phi(\theta)$ is the phase at a point having an azimuthal coordinate $\theta$, and a is a variation amplitude of mirror displacement, such that the difference between a peak of the phase mask and a valley of the phase mask is equal to 2a, and 2n is the number of cycles in azimuthal phase variations. When n is equal to one, the phase profile 50, and the corresponding width of the phase mask, will vary across two complete cycles in a single circumscription of the phase mask. It will be appreciated that more complex phase profiles can be generated using larger values of n, with the number of cycles associated with a circumscription of the phase mask increasing proportionately, such that four cycles are realized when n is equal to 2 and six cycles are realized when n is equal to three. It will be appreciated, however, that to achieve more complex phase profiles, it would be necessary to increase the number of motors utilized to deform the annular reflector.

In order to have zero on-axis intensity, the phase profile 50 must satisfy the following relationship:

$$\int_{-\pi}^{\pi} e^{i\phi(\theta)}\, d\theta = \int_{-\pi}^{\pi} e^{ia\cos(2n\theta)}\, d\theta \qquad \text{Eq. 2}$$
$$= 2\pi J_0(a)$$
$$= 0$$

Accordingly, a displacement amplitude, a, should be equal to the zeros of a Bessel function of the zeroth order. Thus, the position of the drivers should be selected to produce a difference in path length equal to ($8\pi a \cos \omega/\lambda$) between light reflected from the annular reflector at the first pair of drivers and light reflected from the annular reflector at the second pair of drivers where $\omega$ is the incidence angle at the annular reflector, $\lambda$ is the expected wavelength of incident light. If the first zero of zeroth order Bessel function is chosen, then a is determined from the relation $4\pi a \cos \omega/\lambda = 2.405$.

Figure 4:
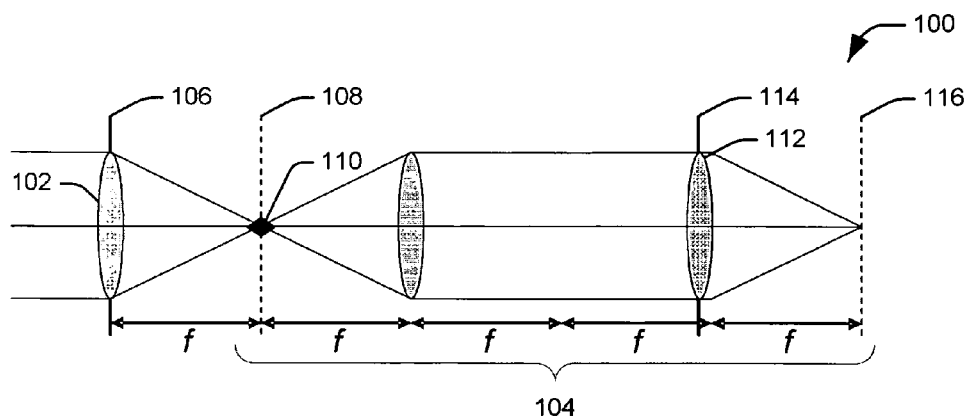
FIG. 4 illustrates a coronagraph utilizing an adaptive phase mask having a continuous phase variation in an azimuthal direction in accordance with an aspect of the present invention.

FIG. 4 illustrates a coronagraph 100 utilizing an adaptive phase mask having a continuous phase variation in an azimuthal direction in accordance with an aspect of the present invention. The illustrated coronagraph 100 consists of a first imaging lens 102 followed by a re-imaging system 104. A first pupil 106 defines an entrance to the coronagraph, and an image associated with the first imaging lens 102 forms at a first focal plane 108. To obtain a corona image at a reimaging plane 116, a phase mask 110 can be placed at the first focal plane 108 to attenuate an undesired central image (e.g., an image of a star) having a greater intensity than the desired image and a second pupil 114 can be utilized at a second lens plane 112 to suppress undesirable diffraction. In the typical circumstance, the undesired central image is effectively a point source, and the image at the first focal plane 108 is dominated by an Airy pattern induced by the entrance aperture.

A desired image, generally of a much lower intensity than the undesired central image, can be represented as a displaced secondary Airy pattern at the first focal plane 108. In order to suppress the primary Airy pattern at a reimaging plane 116, the phase mask 110 is placed at the first focal plane 108 to create, in concert with the second lens 112 at the second pupil plane 114, a null intensity on axis at the reimaging plane 116. The phase mask 110 can comprise an adaptive phase mask assembly incorporating a flexible annular reflector and a conical mirror assembly in accordance with an aspect of the present invention. Configured correctly, the adaptive phase mask assembly can introduce a continuously varying different in path length in the azimuthal direction in incident light to apply the desired phase shift. As a result, the on-axis (e.g., central) intensity of the image, and accordingly, the majority of the primary Airy pattern, can be suppressed at the reimaging plane 116.

Figure 5:
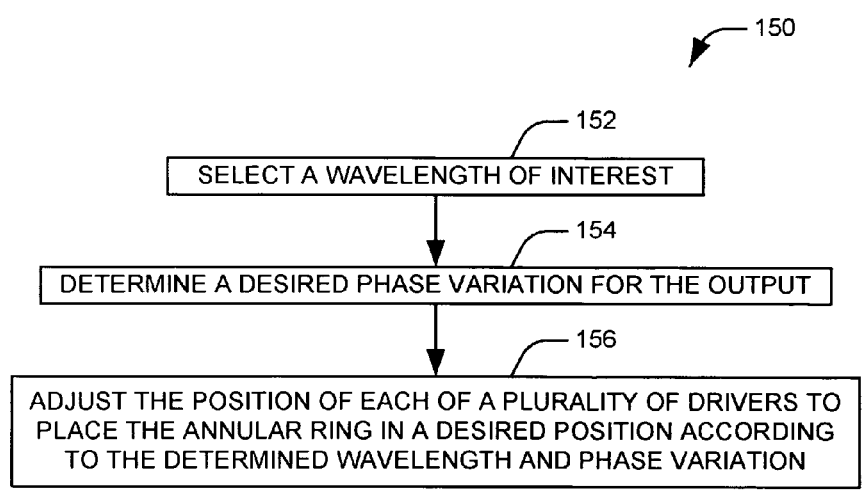
FIG. 5 illustrates a methodology for configuring an adaptive phase mask assembly that provides a continuous phase variation to incident light along an azimuthal direction in accordance with an aspect of the present invention

FIG. 5 illustrates a methodology 150 for configuring an adaptive phase mask assembly that provides a continuous phase variation to incident light along an azimuthal direction in accordance with an aspect of the present invention. At 152, a wavelength of interest is selected. In accordance with an aspect of the present invention, the adaptive phase mask assembly can be operative to impose a desired phase response onto light of any wavelength within a relatively broad spectrum (e.g., the visible light spectrum). Accordingly, a flexible annular reflector is utilized that is configured relative to a conical mirror assembly such that it can be deformed via a plurality of drivers to achieve a desired phase response.

At 154, a desired phase response is selected. In accordance with an aspect of the present invention, the adaptive phase mask is intended to apply a sinusoidal phase variation in an azimuthal direction to incident light. The rate of this variation, measured in sinusoidal cycles per circumscription, and the amplitude of the variation are parameters that can be selected by a user within predetermined ranges. In one implementation, the amplitude of the sinusoidal variation can be determined automatically, for example, as a zero associated with a zeroth order Bessel function. At 156, the drivers associated with the phase mask assembly are adjusted to deform the annular reflector into appropriate position to implement the desired phase profile for the selected wavelength. By deforming the annular ring appropriately, the path length of light can be made to vary at each azimuthal angle, such that the desired azimuthal variation in phase can be introduced.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A phase mask apparatus for producing a desired phase response in incident light, comprising:
   a conical mirror assembly;
   a flexible annular reflector that substantially surrounds at least a portion of the conical mirror assembly and is configured to receive reflected light from the conical mirror assembly; and
   a plurality of driver assemblies that are operative to deform the flexible annular reflector as to produce the desired phase response in light reflected from the annular reflector.

2. The apparatus of claim 1, wherein the plurality of driver assemblies comprise a first driver assembly, a second driver assembly positioned ninety degrees in a first direction from the first driver assembly on the flexible annular reflector, a third driver assembly positioned one hundred eighty degrees in the first direction from the first driver assembly on the flexible annular reflector, and the fourth driver being positioned two hundred seventy degrees in the first direction on the flexible annular reflector.

3. The apparatus of claim 1, further comprising a driver control that instructs the plurality of drivers to deform the flexible annular reflector as to achieve a desired phase response from the phase mask apparatus.

4. The apparatus of claim 1, wherein the driver control comprises a memory having a plurality of predetermined configurations for the plurality of drivers, each of the predetermined configurations being associated with a particular band of wavelengths and a desired phase response.

5. The apparatus of claim 1, wherein each of the plurality of drivers is operative to move an associated portion of the flexible annular reflector one of radially inward and radially outward, such that the distance between the associated portion of the flexible annular reflector and the conical mirror assembly can be increased or decreased.

6. The apparatus of claim 1, wherein the plurality of drivers are configured to deform the flexible annular reflector such that the difference in path length for light reflected at a portion of the flexible annular reflector associated with a first driver and light reflected at a portion of the flexible annular reflector associated with a second driver is equal in radians to a solution to a zeroth order Bessel function.

7. The apparatus of claim 1, wherein the conical mirror assembly comprises a first conical mirror, that reflects incident light, to the flexible annular reflector, and a second conical mirror that receives reflected light from the flexible annular reflector and reflects the received light such that it travels parallel to an axis of the second conical mirror.

8. The apparatus of claim 1, wherein the plurality of driver assemblies comprise electric step motors that mechanically engage the flexible annular reflector.

9. A coronagraph apparatus for separating a desired image from an undesired central image having a greater intensity, comprising:
- a first imaging lens that receives light representing the desired image and the undesired central image; and
- a reimaging portion that mitigates the undesired central image, the reimaging portion comprising a phase mask assembly, comprising:
  - a conical mirror;
  - a flexible annular reflector configured to receive reflected light from the conical mirror; and
  - a plurality of driver assemblies that are operative to deform the flexible annular reflector as to produce the desired phase response in light reflected from the annular reflector.

10. The apparatus of claim 9, wherein the plurality of driver assemblies comprise a first driver assembly, a second driver assembly positioned ninety degrees in a first direction from the first driver assembly on the flexible annular reflector, a third driver assembly positioned one hundred eighty degrees in the first direction from the first driver assembly on the flexible annular reflector, and the fourth driver being positioned two hundred seventy degrees in the first direction on the flexible annular reflector.

11. The apparatus of claim 9, further comprising a driver control that instructs the plurality of drivers to deform the flexible annular reflector as to achieve a desired phase response from the phase mask assembly.

12. The apparatus of claim 9, wherein the driver control comprises a memory having a plurality of predetermined configurations for the plurality of drivers, each of the predetermined configurations being associated with a particular band of wavelengths and a desired phase response.

13. The apparatus of claim 9, wherein each of the plurality of drivers is operative to move an associated portion of the flexible annular reflector one of radially inward and radially outward, such that the distance between the associated portion of the flexible annular reflector and the conical mirror assembly can be increased or decreased.

14. The apparatus of claim 9, wherein the plurality of drivers are configured to deform the flexible annular reflector such that the difference in path length for light reflected at a portion of the flexible annular reflector associated with a first driver and light reflected at a portion of the flexible annular reflector associated with a second driver is equal in radians to a solution to a zeroth order Bessel function.

15. The apparatus of claim 9, wherein the conical mirror assembly comprises a first conical mirror, that reflects incident light, to the flexible annular reflector, and a second conical mirror that receives reflected light from the flexible annular reflector and reflects the received light such that it travels parallel to an axis of the second conical mirror.

16. The apparatus of claim 9, wherein the plurality of driver assemblies comprise electric step motors that mechanically engage the flexible annular reflector.

17. A method for adaptively providing a continuous phase variation to incident light along an azimuthal direction via a phase mask, comprising:
- selecting a wavelength of interest;
- determining a desired phase response for the phase mask; and
- positioning a plurality of drivers associated with the phase mask to deform an annular reflector in the path of incident light, such that the path length taken by the incident light is adjusted as to implement the desired phase response for light of the wavelength of interest.

18. The method of claim 17, wherein positioning the plurality of drivers comprises moving an associated portion of the flexible annular reflector one of radially inward and radially outward.

19. The method of claim 17, wherein positioning the plurality of drivers comprises retrieving a set of driver positions from an associated memory according to the desired phase response and the wavelength of interest.

* * * * *